United States Patent [19]

Tupy

[11] 3,906,612
[45] Sept. 23, 1975

[54] METHOD AND APPARATUS FOR DISASSEMBLING PLASTIC PIPE FROM PLASTIC FITTINGS WITHOUT DAMAGING THE FITTING

[76] Inventor: John Tupy, 57 N. Arch St., Johnson City, N.Y. 13790

[22] Filed: May 3, 1974

[21] Appl. No.: 466,840

[52] U.S. Cl. .................. 29/426; 29/401; 29/427; 165/142
[51] Int. Cl.² .......................................... B23P 19/00
[58] Field of Search ........ 264/80, 230, 231; 285/21, 285/41; 277/9, 9.5, 10; 156/344; 29/426, 427, 401, 447; 432/224, 225, 226, 227; 165/142

[56] References Cited
UNITED STATES PATENTS

| | | | |
|---|---|---|---|
| 138,531 | 5/1873 | Salisbury et al. | 432/224 |
| 388,045 | 8/1888 | Hughes | 432/224 |
| 492,366 | 2/1893 | Reed | 165/142 |
| 2,441,353 | 5/1948 | Gosmann et al. | 29/427 |
| 2,843,925 | 7/1958 | Logue et al. | 29/427 |
| 3,246,393 | 4/1966 | Worth | 29/426 |
| 3,466,020 | 9/1969 | Blinne | 432/225 |

Primary Examiner—C. W. Lanham
Assistant Examiner—James R. Duzan
Attorney, Agent, or Firm—Plumley & Tyner

[57] ABSTRACT

A method and apparatus for separating a thermoplastic fitting from a thermoplastic pipe cemented therein without damaging the fitting which can be recovered for reuse is disclosed. The method involves heating the inside surface of the pipe in the area in which the fitting and pipe are cemented up to about the softening temperature of the pipe, then pulling out the softened pipe. Heating of the pipe is accomplished without any damaging heating of the fitting by a cylindrical device having an outside diameter slightly smaller than the inside diameter of the plastic pipe. In a preferred embodiment, the cylindrical device is a pipe closed at one end with a heating baffle inside extending from near the closed end and beyond the open end. The heating baffle provides for heating with a torch as used in the plumbing trade. The heat-softened inside pipe is easily removed when softened while the fitting remains intact and undamaged.

6 Claims, 3 Drawing Figures

METHOD AND APPARATUS FOR DISASSEMBLING PLASTIC PIPE FROM PLASTIC FITTINGS WITHOUT DAMAGING THE FITTING

BACKGROUND OF THE INVENTION

Plumbing codes in many communities of this country now permit the use of plastic pipe. Because of cost and handling advantages, plastic pipe is being widely substituted for metal pipe, where permitted. However, the use of plastic pipe in this application is accompanied by certain disadvantages not encountered with metal pipes. In particular, the various fittings used with metal pipes, such as tees, elbows, and the like, could normally be disassembled from the pipe and reused since the fittings are typically threaded or "sweat fitted." In either case, the metal fitting is not normally damaged beyond reuse in disassembly.

On the other hand, plastic pipe systems are typically assembled by cementing the pipe inside the fitting with a cement which slightly dissolves plastic at the interface. Furthermore, the pipe and fittings are made of thermoplastic material such as PVC (polyvinylchloride) which becomes distorted upon heating. Therefore, it is not possible to disassemble a plastic pipe from plastic fitting by heating in the way that disassembly could be accomplished with a metal pipe sweat-fitted in a metal fitting. As a consequence, disassembly of a plastic pipe system has inevitably led to the scrapping of the old fittings which up till now, of course, had to be replaced. Also, fittings often must be scrapped where, in the course of assembly a plastic pipe system, a mistake is made. For example, if an error is made in orienting two fittings incorrectly relative to one another at least one of the fittings must be disattached. Because the cement which is used in connecting plastic pipes and fittings sets rapidly, not much time is allowed for adjustment and correction of mistakes. Finally, it is often necessary to disassemble and replace more elements in a plastic type system than would be necessary in a similar metal pipe system because of the damage done to the fittings in disassembly of the plastic fittings.

As a result of the foregoing, the use of plastic pipe has associated with it a considerable waste of time and materials, particularly fittings, and considerable time and material could be saved in a method of removing plastic pipe from plastic fitting was available. In view of the increased use of plastic pipe, the desirability of a method for disassembly of plastic pipes and plastic fittings so that the fittings can be reused is apparent.

DESCRIPTION OF THE PRIOR ART

U.S. Pat. No. 3,246,393 discloses a method for removing a fitting from a hose and salvaging the fitting. The method simply involves the heating of fitting to a temperature high enough to soften the plastic hose but not high enough to damage the metal fitting, and then pulling the hose from the fitting. This method clearly would not be suitable for separating a pipe and fitting which are both made of the same heat softenable or "thermoplastic" material which is the problem solved by this invention.

SUMMARY OF THE INVENTION

The method of this invention provides a way of separating thermoplastic fittings from thermoplastic pipe cemented therein by preferentially heating the pipe up to about its softening point around the area of the cemented joint without substantial heating of the fitting. This is accomplished by heating the inner surface of the pipe in the area of the joint to a temperature substantially higher than the fitting and high enough to soften the plastic pipe. Preferably, heating is done with a cylindrical heat transfer device having an outside diameter slightly smaller than the inside diameter of the thermoplastic pipe. The cylindrical heat transfer device, in its simpliest form, can be a piece of pipe of the appropriate diameter which is heated to the necessary temperature before insertion into the plastic pipe or a cylindrical device which has provision for heating after it is inserted into the plastic pipe. Once the pipe is heated to above its softening point, it is easily removed from the fitting by simply pulling the softened pipe away from the still solid fitting. The apparatus of this invention provides a device which can be conveniently heated with a torch either before or after it is inserted into the plastic pipe.

Briefly, the preferred embodiment of the apparatus of this invention comprises a hollow metallic cylinder or pipe closed at one end and having a sheet metal baffle which divides the cylinder into two hemicylindrical compartments. The baffle does not extend all the way to the closed end however, and therefore, defines a U-shaped passage. At the upper end, the baffle extends outside the cylinder and is bent away from the plane it assumes within the cylinder. Part way between the open and closed end of the cylinder on its outside is an abutment or shoulder large enough to restrict passage of the cylinder into the plastic pipe. In use, the cylindrical heat transfer device is placed into the plastic pipe, closed end first, to the extent permitted by the shoulder or abutment. Heat is applied by means of a torch into the passage defined by the baffle and cylinder wall. The flame of the torch is applied in the opposite direction of the bend in the baffle whereby the hot gases flow through the U-shaped passage heating the outer walls of heat transfer device somewhat uniformly, which heating in turn causes softening of the plastic pipe which is removed by pulling it away from the fitting.

The cylindrical heat transfer device is made of any suitable metal and may be provided with a heat insulative handle as an optional feature. Suitable metals include those which have melting points high enough to withstand heating by whatever heating means is chosen, for example a torch, as described in the preferred embodiment below. Accordingly, suitable metals include iron, copper and aluminum among others. For reasons of cost, iron is preferred. It is critically important in the selection of the metal that consideration be given to its coefficient of thermal expansion. For example, with aluminum, which does have a high coefficient of thermal expansion, the diameter of the cylindrical heat transfer device must be such that it is slightly smaller than the inner diameter of the plastic pipe when the heat transfer device is in its heated state so that it can be inserted and withdrawn from the pipe freely.

Plastic pipe used in plumbing applications is made from a thermoplastic material such as polyvinyl chloride (PVC) being particularly common. Depending on the exact constitution of the plastic used for the pipe heat distortion and softening occurs at temperatures which rarely exceed 250°F. Therefore, the temperatures required in the process are relatively low. In fact, excessively high temperatures are to be avoided because the plastic can decompose, often giving off noxious fumes.

Standard plastic pipe of the drainage type known as "D. W. V." in the plumbing trade is available in 1½ inch, 2 inch and 3 inch inside diameters as the most common sizes. Accordingly, the practice of this invention requires a corresponding set of three sizes of the apparatus.

Although the specific embodiment of the apparatus described below is intended for heating with a torch this is a matter of convenience in the practice of the invention in the plumbing trades in which a torch is a readily available heat source. However, the apparatus may be heated in any suitable way, for example, electrically or by burning solid chemical fuel cartridges in the cylinder. Furthermore, the preferred embodiment is heated after insertion in the plastic pipe to be removed primarily so that it can be visually determined when heating of the plastic pipe has progressed to the proper point. However, heating can be accomplished before the apparatus is inserted in the plastic pipe. If such a procedure is contemplated, it would be valuable to equip the apparatus with a temperature sensing element and to experimentally determine the optimum temperature of the apparatus should reach before it is inserted in the pipe. Of course, when it is intended to preheat the apparatus the apparatus of the preferred embodiment need not be employed. Particularly, the baffle feature and a cylinder with a closed bottom are not necessary because these features are only desirable where the apparatus is to be heated with a torch and after positioning in the pipe.

In the practice of the process of this invention and in using the apparatus of this invention, the first step is to cut off the pipe to be removed near the fitting leaving an inch or so of the pipe protruding from the fitting. After the pipe is heated from the inside to its softening point, it is easily pried out or pulled away from the fitting.

DETAILED DESCRIPTION OF THE DRAWINGS

Figure 1:
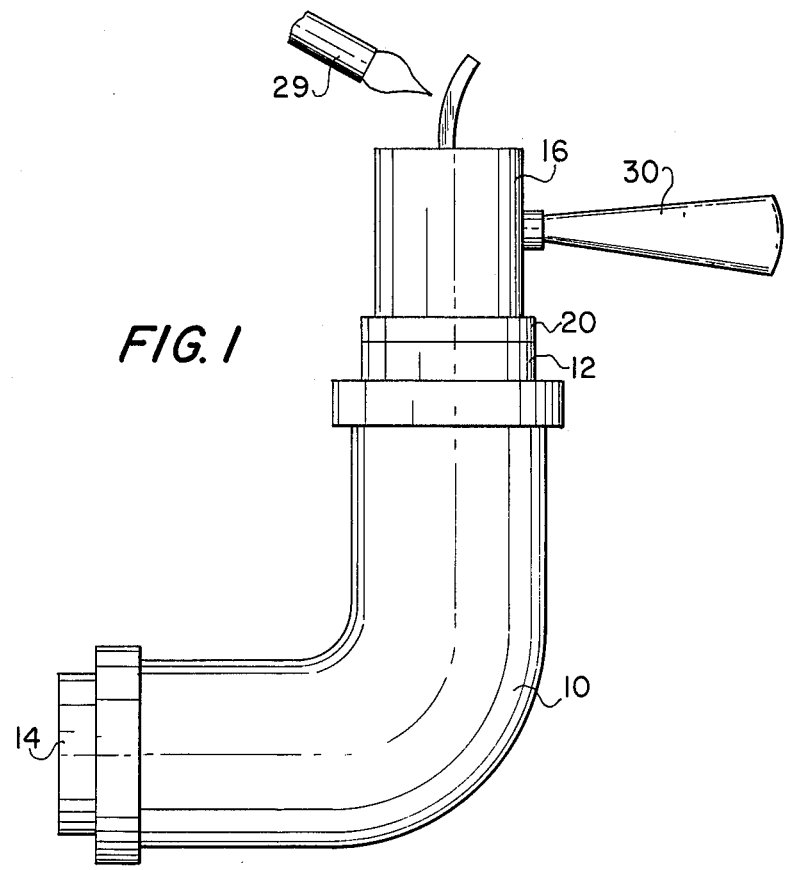
FIG. 1 is an elevational view of a plastic fitting containing a section of plastic pipe to be removed with the apparatus of this invention in place.
Figure 2:
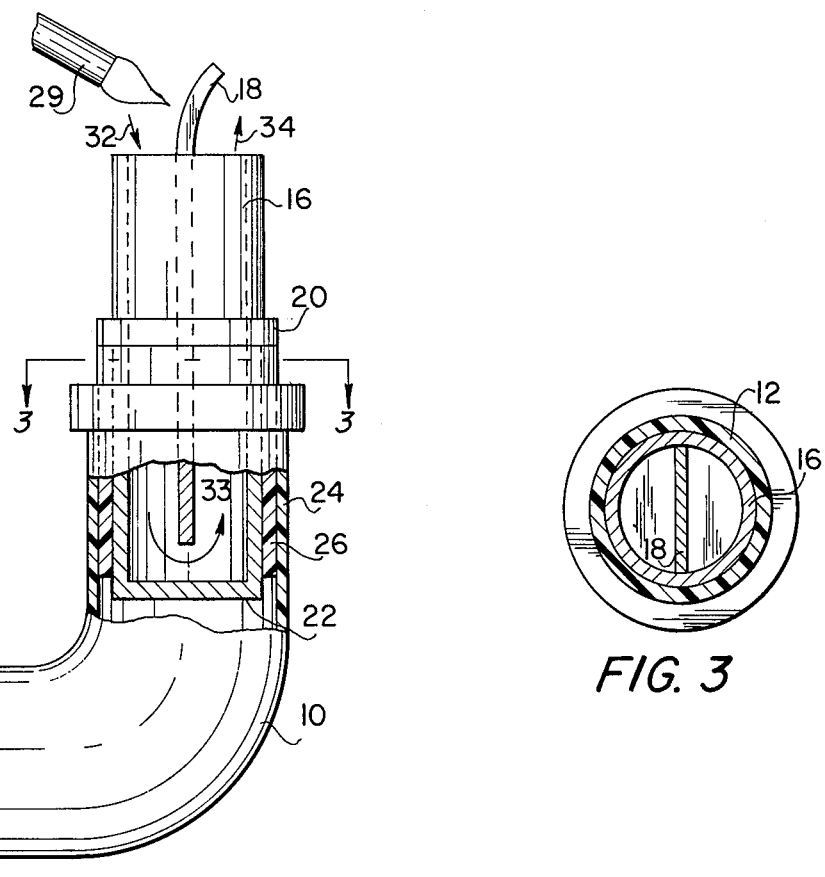
FIG. 2 is a view, with parts broken away and shown in section, of the apparatus of this invention in use in heating a section of plastic pipe cemented in a plastic fitting.
Figure 3:
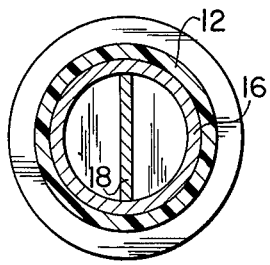
FIG. 3 is a sectional view taken along line 3—3 of FIG. 2.

A specific embodiment of the apparatus of this invention 16 is shown in place in the fitting 10, which contains pipe segments 12 and 14. The apparatus is engaged in pipe 12 which is to be removed. The apparatus prevented from deeper penetration into the pipe and possible contact with the fitting 10 by shoulder 20 on the outside of the cylindrical member 16.

Disposed longitudinally in the cylindrical heat transfer member 16 is a baffle 18 which is bent at its uppermost extremity. The cylindrical heat transfer member 16 is provided with a bottom 22. Hot gases from the torch 29 pass through the U-shaped passage defined by the arrows 32, 33, and 34, heating the surfaces of the heat transfer member 16 substantially uniformly. Close contact between the heat transfer member 16 and pipe wall 26 in turn heats the pipe wall 26 to its softening point. When softened, the bond between the pipe wall 26 and the fitting wall 24 is sufficiently loosened to allow extraction of the pipe 12. This is accomplished by removing the apparatus 16 from the pipe 12 and then pulling the pipe 12 from the fitting 10. Heat insulative handle 30 is optional.

I claim:

1. A method for separating plastic fittings from plastic pipe cemented therein without damaging the plastic fitting in which both the pipe and fitting are made of the thermoplastic material comprising the steps of
   a. inserting into the plastic pipe a cyclindrical heat transfer means having an outside diameter slightly smaller than the inside diameter of said plastic pipe;
   b. heating the inside surface of the plastic pipe adjacent to the area in which it is cemented to the plastic fitting with the cylindrical heat transfer means until the plastic pipe is softened;
   c. removing said cylindrical heat transfer means from the plastic pipe; and
   d. removing the softened plastic pipe from the plastic fitting.

2. The method of claim 1 in which the cylindrical heat transfer means is heated after insertion into the plastic pipe.

3. The method of claim 1 in which the cylindrical heat transfer means is heated before insertion into the plastic pipe.

4. The method of claim 1 in which said heating step (b) is accomplished by applying a torch to a hollow cylindrical heat transfer means having an open upper end, a closed lower end and an outside diameter slightly smaller than the inside diameter of said plastic pipe; abutment means disposed between said open upper end and closed lower end for limiting the depth of penetration of said cylindrical heat transfer means into said plastic pipe; and a baffle means longtitudinally disposed within said cylindrical heat transfer means and extending from near the closed end and above the upper end to provide a passage for hot gases generated during torch heating.

5. A portable apparatus adapted to be heated by a torch for separating plastic fittings from plastic pipe cemented therein comprising a hollow cylindrical heat transfer means having an open upper end, a closed lower end and an outside diameter slightly smaller than the inside diameter of said plastic pipe; abutment means disposed between said open upper end and closed lower end for limiting the depth of penetration of said cylindrical heat transfer means into said plastic pipe; and a baffle means longitudinally disposed within said cylindrical heat transfer means and extending from near the closed end and above the upper end to provide a passage for hot gases generated during torch heating; said baffle means being bent away from the longitudinal at a point above the upper open end of said cylindrical heat transfer means.

6. The apparatus of claim 5 having a heat insulative handle means at or above said means for limiting the depth of penetration into the plastic pipe.

* * * * *